US008528071B1

(12) United States Patent
Kwan (10) Patent No.: US 8,528,071 B1
(45) Date of Patent: Sep. 3, 2013

(54) SYSTEM AND METHOD FOR FLEXIBLE AUTHENTICATION IN A DATA COMMUNICATIONS NETWORK

(75) Inventor: Philip Kwan, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 1263 days.

(21) Appl. No.: 10/925,155

(22) Filed: Aug. 24, 2004

Related U.S. Application Data (60) Provisional application No. 60/527,266, filed on Dec. 5, 2003.

(51) Int. Cl.
*H04L 29/06* (2006.01)

(52) U.S. Cl.
USPC .......................................................... 726/14

(58) Field of Classification Search
None
See application file for complete search history.

(56) References Cited

U.S. PATENT DOCUMENTS

| | | | |
|---|---|---|---|
| 4,897,874 A | 1/1990 | Lidinsky et al. | |
| 5,237,614 A | 8/1993 | Weiss | |
| 5,721,780 A | 2/1998 | Ensor et al. | |
| 5,757,924 A | 5/1998 | Friedman et al. | |
| 5,774,551 A | 6/1998 | Wu et al. | |
| 5,812,819 A * | 9/1998 | Rodwin et al. | 703/23 |
| 5,825,890 A * | 10/1998 | Elgamal et al. | 713/151 |
| 5,835,720 A | 11/1998 | Nelson et al. | |
| 5,892,903 A | 4/1999 | Klaus | 395/187.01 |
| 5,894,479 A * | 4/1999 | Mohammed | 370/401 |
| 5,946,308 A | 8/1999 | Dobbins et al. | |
| 5,951,651 A | 9/1999 | Lakshman et al. | |
| 5,958,053 A | 9/1999 | Denker | 713/201 |
| 5,974,463 A * | 10/1999 | Warrier et al. | 709/225 |
| 6,009,103 A | 12/1999 | Woundy | |
| 6,021,495 A * | 2/2000 | Jain et al. | 726/16 |
| 6,115,376 A * | 9/2000 | Sherer et al. | 370/389 |
| 6,167,052 A | 12/2000 | McNeill et al. | |
| 6,167,445 A | 12/2000 | Gai et al. | |
| 6,212,191 B1 | 4/2001 | Alexander et al. | |
| 6,219,790 B1 * | 4/2001 | Lloyd et al. | 726/14 |
| 6,256,314 B1 | 7/2001 | Rodrig et al. | |
| 6,338,089 B1 | 1/2002 | Quinlan | |
| 6,339,830 B1 | 1/2002 | See et al. | 713/202 |
| 6,363,489 B1 | 3/2002 | Comay et al. | |
| 6,393,484 B1 | 5/2002 | Massarani | |
| 6,496,502 B1 | 12/2002 | Fite, Jr. et al. | |
| 6,510,236 B1 * | 1/2003 | Crane et al. | 382/116 |
| 6,519,646 B1 | 2/2003 | Gupta et al. | 709/229 |

(Continued)

OTHER PUBLICATIONS

"Catalyst 2950 Desktop Switch Software Configuration Guide," CISCO, Cisco IOS Release 12.1(9)EA1, Apr. 2002.*

(Continued)

*Primary Examiner* — Oscar Louie
(74) *Attorney, Agent, or Firm* — Nixon Peabody LLP; John P. Schaub (57) ABSTRACT

A system and method for providing for a number of different authentication methods. The system and method can be used in conjunction with a data communications network, where client devices gain access to the data communications network through a network access device. The different authentication methods can allow for authentication based on a physical address for the client device, and can allow for authentication based on a web authentication procedure, and can provide for an authentication method which utilizes a combination of authentication methods which includes authentication based on both the physical address of the client device and based on user credential information.

35 Claims, 4 Drawing Sheets

(56) References Cited

U.S. PATENT DOCUMENTS

| | | | |
|---|---|---|---|
| 6,553,028 | B1 | 4/2003 | Tang et al. |
| 6,615,264 | B1* | 9/2003 | Stoltz et al. ................... 709/227 |
| 6,651,168 | B1* | 11/2003 | Kao et al. ....................... 713/185 |
| 6,665,278 | B2 | 12/2003 | Grayson |
| 6,728,246 | B1 | 4/2004 | Egbert et al. |
| 6,732,270 | B1* | 5/2004 | Patzer et al. ................... 713/170 |
| 6,751,728 | B1 | 6/2004 | Gunter et al. |
| 6,771,649 | B1 | 8/2004 | Tripunitara et al. |
| 6,775,290 | B1 | 8/2004 | Merchant et al. |
| 6,807,179 | B1 | 10/2004 | Kanuri et al. |
| 6,813,347 | B2 | 11/2004 | Baals et al. |
| 6,853,988 | B1* | 2/2005 | Dickinson et al. .............. 705/75 |
| 6,874,090 | B2 | 3/2005 | See et al. |
| 6,892,309 | B2 | 5/2005 | Richmond et al. |
| 6,907,470 | B2 | 6/2005 | Sawada et al. |
| 6,912,592 | B2 | 6/2005 | Yip |
| 6,950,628 | B1 | 9/2005 | Meier et al. |
| 6,959,336 | B2* | 10/2005 | Moreh et al. ................... 709/229 |
| 6,980,515 | B1 | 12/2005 | Schunk et al. |
| 6,981,054 | B1 | 12/2005 | Krishna |
| 7,028,098 | B2 | 4/2006 | Mate et al. |
| 7,032,241 | B1* | 4/2006 | Venkatachary et al. .......... 726/4 |
| 7,062,566 | B2 | 6/2006 | Amara et al. |
| 7,079,537 | B1 | 7/2006 | Kanuri et al. |
| 7,088,689 | B2 | 8/2006 | Lee et al. |
| 7,092,943 | B2 | 8/2006 | Roese et al. |
| 7,093,280 | B2 | 8/2006 | Ke et al. |
| 7,113,479 | B2 | 9/2006 | Wong |
| 7,114,008 | B2 | 9/2006 | Jungck et al. |
| 7,131,141 | B1 | 10/2006 | Blewett et al. |
| 7,134,012 | B2 | 11/2006 | Doyle et al. |
| 7,155,518 | B2 | 12/2006 | Forslöw |
| 7,188,364 | B2 | 3/2007 | Volpano |
| 7,194,554 | B1 | 3/2007 | Short et al. |
| 7,215,637 | B1 | 5/2007 | Ferguson et al. |
| 7,216,229 | B2 | 5/2007 | Hu |
| 7,234,163 | B1 | 6/2007 | Rayes et al. |
| 7,249,374 | B1 | 7/2007 | Lear et al. |
| 7,302,700 | B2 | 11/2007 | Mao et al. |
| 7,343,441 | B1 | 3/2008 | Chrysanthakopoulos et al. |
| 7,360,086 | B1 | 4/2008 | Tsuchiya et al. |
| 7,360,245 | B1 | 4/2008 | Ramachandran et al. |
| 7,367,046 | B1 | 4/2008 | Sukiman et al. |
| 7,469,298 | B2* | 12/2008 | Kitada et al. ................... 709/236 |
| 7,483,971 | B2 | 1/2009 | Sylvest et al. |
| 7,490,351 | B1 | 2/2009 | Caves et al. |
| 7,493,084 | B2 | 2/2009 | Meier et al. |
| 7,500,069 | B2 | 3/2009 | Hochmuth et al. |
| 7,502,926 | B2* | 3/2009 | Luo et al. ....................... 713/163 |
| 7,516,487 | B1 | 4/2009 | Szeto et al. |
| 7,523,485 | B1 | 4/2009 | Kwan |
| 7,529,933 | B2 | 5/2009 | Palekar et al. |
| 7,536,464 | B1 | 5/2009 | Dommety et al. |
| 7,562,390 | B1 | 7/2009 | Kwan |
| 7,567,510 | B2 | 7/2009 | Gai et al. |
| 7,587,750 | B2* | 9/2009 | Zimmer et al. ................... 726/2 |
| 7,596,101 | B2 | 9/2009 | Oguchi |
| 7,596,693 | B1 | 9/2009 | Caves et al. |
| 7,624,431 | B2* | 11/2009 | Cox et al. ........................ 726/4 |
| 7,673,146 | B2 | 3/2010 | Wiedmann et al. |
| 7,735,114 | B2* | 6/2010 | Kwan et al. ...................... 726/1 |
| 7,752,320 | B2* | 7/2010 | Kappes et al. ................ 709/229 |
| 7,774,833 | B1 | 8/2010 | Szeto et al. |
| 7,876,772 | B2 | 1/2011 | Kwan |
| 7,921,290 | B2* | 4/2011 | Albert et al. ................... 713/168 |
| 7,979,903 | B2 | 7/2011 | Kwan |
| 8,006,304 | B2 | 8/2011 | Kwan |
| 2001/0012296 | A1 | 8/2001 | Burgess et al. |
| 2002/0016858 | A1 | 2/2002 | Sawada et al. |
| 2002/0055980 | A1 | 5/2002 | Goddard |
| 2002/0065938 | A1 | 5/2002 | Jungck et al. |
| 2002/0133534 | A1 | 9/2002 | Forslow |
| 2002/0146002 | A1 | 10/2002 | Sato |
| 2002/0146107 | A1 | 10/2002 | Baals et al. |
| 2002/0165956 | A1 | 11/2002 | Phaal |
| 2003/0028808 | A1 | 2/2003 | Kameda |
| 2003/0037163 | A1* | 2/2003 | Kitada et al. ................... 709/236 |
| 2003/0043763 | A1 | 3/2003 | Grayson |
| 2003/0046391 | A1* | 3/2003 | Moreh et al. ................... 709/225 |
| 2003/0051041 | A1 | 3/2003 | Kalavade et al. |
| 2003/0056001 | A1 | 3/2003 | Mate et al. |
| 2003/0056063 | A1 | 3/2003 | Hochmuth et al. |
| 2003/0056096 | A1* | 3/2003 | Albert et al. ................... 713/168 |
| 2003/0065944 | A1 | 4/2003 | Mao et al. |
| 2003/0067874 | A1 | 4/2003 | See et al. |
| 2003/0105881 | A1 | 6/2003 | Symons et al. |
| 2003/0142680 | A1 | 7/2003 | Oguchi |
| 2003/0167411 | A1 | 9/2003 | Maekawa |
| 2003/0169713 | A1* | 9/2003 | Luo ................................ 370/338 |
| 2003/0177350 | A1 | 9/2003 | Lee |
| 2003/0188003 | A1 | 10/2003 | Sylvest et al. |
| 2003/0217151 | A1 | 11/2003 | Roese et al. |
| 2003/0226017 | A1 | 12/2003 | Palekar et al. |
| 2003/0236898 | A1 | 12/2003 | Hu |
| 2004/0003285 | A1 | 1/2004 | Whelan et al. |
| 2004/0053601 | A1 | 3/2004 | Frank et al. |
| 2004/0078485 | A1 | 4/2004 | Narayanan |
| 2004/0098588 | A1* | 5/2004 | Ohba et al. ..................... 713/169 |
| 2004/0160903 | A1 | 8/2004 | Gai et al. |
| 2004/0172559 | A1* | 9/2004 | Luo et al. ....................... 713/201 |
| 2004/0177276 | A1 | 9/2004 | Mackinnon et al. |
| 2004/0210663 | A1 | 10/2004 | Phillips et al. |
| 2004/0213172 | A1 | 10/2004 | Myers et al. |
| 2004/0213260 | A1 | 10/2004 | Leung et al. |
| 2004/0255154 | A1 | 12/2004 | Kwan et al. |
| 2004/0268140 | A1* | 12/2004 | Zimmer et al. ................. 713/200 |
| 2005/0021979 | A1 | 1/2005 | Wiedmann et al. |
| 2005/0025125 | A1 | 2/2005 | Kwan |
| 2005/0055570 | A1* | 3/2005 | Kwan et al. ................... 713/201 |
| 2005/0080921 | A1 | 4/2005 | Lu |
| 2005/0091313 | A1 | 4/2005 | Zhou et al. |
| 2005/0111466 | A1* | 5/2005 | Kappes et al. ................. 370/400 |
| 2005/0125692 | A1* | 6/2005 | Cox et al. ...................... 713/201 |
| 2005/0185626 | A1 | 8/2005 | Meier et al. |
| 2005/0254474 | A1 | 11/2005 | Iyer et al. |
| 2006/0028996 | A1 | 2/2006 | Huegen et al. |
| 2006/0155853 | A1 | 7/2006 | Nesz et al. |
| 2007/0220596 | A1 | 9/2007 | Keeler et al. |
| 2009/0254973 | A1 | 10/2009 | Kwan |
| 2009/0260083 | A1 | 10/2009 | Szeto et al. |
| 2009/0265785 | A1 | 10/2009 | Kwan |
| 2009/0307773 | A1 | 12/2009 | Kwan |
| 2010/0333191 | A1 | 12/2010 | Szeto et al. |
| 2012/0011584 | A1 | 1/2012 | Kwan |
| 2012/0216256 | A1 | 8/2012 | Kwan |

OTHER PUBLICATIONS

"IEEE 802.1X Authentication for Wireless Connections," The Cable Guy, Apr. 2002, http://technet.microsoft.com/en-us/library/bb878016.aspx.*

"White Paper: 802.1X Port Authentication With Microsoft's Active Directory," Philip Kwan, Mar. 2003, http://www.brocade.com/downloads/documents/white_papers/wp-8021x-authentication-active-directory.pdf.*

In U.S. Appl. No. 10/458,628, filed Jun. 11, 2003, by Philip Kwan, entitled "Multiple Tiered Network Security System, Method and Apparatus," 33 pages in length.

In U.S. Appl. No. 10/631,898, filed Aug. 1, 2003, by Philip Kwan, entitled "System, Method and Apparatus for Providing Multiple Access Modes in a Data Communications Network," 37 pages in length.

In U.S. Appl. No. 10/654,417, filed Sep. 4, 2003, by Philip Kwan, entitled "Multiple Tiered Network Security System, Method and Apparatus Using Dynamic User Policy Assignment," 36 pages in length.

http://www.cisco.com/en/US/tech/tk86/tk803/technologies_tech_note09186a00800a7828.shtml (PDF & web pages), entitled "Cisco—Cable Source—Verify and IP Address Security," printed Jul. 23, 2003, 25 pages in length.

http://www.sans.org/rr/threats/spoofed.php (PFD and web pages), entitled Spoofed IP Address Distributed Denial of Service Attacks: Defense-in-Depth, printed Jul. 23, 2003, 7 pages in length.

http://www.cert.org/incident_notes/IN-2000-04.html, entitled "CERT® Incident Note IN-2000-04 (Denial of Service Attacks using Nameservers)," printed Jul. 23, 2003, 3 pages in length.
http://www.anml.iu.edu/PDF/Automatic_Spoof_Detector.pdf, entitled "Automatic Spoof Detector (aka Spoofwatch)," dated Jan. 28, 2002, printed Jul. 23, 2003, 2 pages in length.
http://www.linuxgazette.com/issue63/sharma.html, entitled "IP Spoofing," printed Jul. 23, 2003, 3 pages in length.
http://www.legions.org/kv/kv7.txt, entitled "Keen Veracity Legions of the Underground Issue # [7],:" printed Jun. 24, 2003, pp. 1-41.
http://www.networkcommand.com/docs/ipspoof.txt, entitled "[ IP-spoofing Demystified ] (Trust-Relationship Exploitation)," Jun. 1996, printed May 18, 2003, pp. 1-9.
http://www.cisco.com/en/US/products/hw/switches/ps574/products_configuration_guide_chapter09186a008007ef90.html#xtocid3 (PDF & web pages), entitled "CISCO Catalyst 1900 Series Switches," printed Jul. 29, 2003, 13 pages in length.
http://www.cisco.com/en/US/products/sw/iosswrel/ps1839/products_feature_guide09186a00801543c8.html#1027177 (PDF & web pages), entitled "Cicso IOS Software Releases 12.2 T," printed Jul. 29, 2003, 26 pages in length.
http://www.cisco.com/en/US/tech/tk648/tk361/technologies_tech_note09186a0080094adb.shtml (PDF & web pages), entitled "IP Addressing Services," printed Jul. 29, 2003, 10 pages in length.
http://www.extremenetworks.com/libraries/prodpdfs/products/ex_ware_tech_brief.pdf (Extreme Networks PDF), entitled "Tech Brief Extreme Ware 6.2," printed Jul. 29, 2003, 8 pages in length.
http://www.extremenetworks.com/libraries/prodpdfs/products/UnifiedWireless.asp (Extreme Networks PDF & web pages), entitled: Unified Access Architecture for Wired and Wireless Networks, printed Jul. 29, 2003, 10 pages in length.
Alcatel Internetworking, Inc., "Authenticated VLANs: Secure Network Access at Layer 2," An Alcatel White Paper, Nov. 2002, pp. 1-14.
Cisco Systems, Inc., "Configuring 802.1X Port-Based Authentication," Ch. 9, Catalyst 3550 Multilayer Switch Software Configuration Guide, Cisco IOS Release 12.3 (13) EA1, Mar. 2003, pp. 1-18.
Cisco Systems, Inc., "Configuring Port-Based Traffic Control," Ch. 20, Catalyst 3550 Multilayer Switch Software Configuration Guide, Cisco IOS Release 12.3 (13) EA1, Mar. 2003, pp. 1-14.
Cisco Systems, Inc., "Configuring Network Security with ACLs," Ch. 27, Catalyst 3550 Multilayer Switch Software Configuration Guide, Cisco IOS Release 12.3 (13) EA1, Mar. 2003, pp. 1-48.
Congdon, P. et al., "IEEE 802.1X Remote Authentication Dial in User Service (RADIUS) Usage Guidelines," The Internet Society, 2003, pp. 1-30, obtained from http://www.faqs.org/ftp/rfc/pdf/rfc3580.txt.pdf.
IEEE (The Institute of Electrical and Electronics Engineers, Inc.), "Port-Based Network Access Control," 2001, pp. 1-134.
Microsoft, "Recommendations for IEEE 802.11 Access Points," Apr. 2, 2002, pp. 1-12, obtained from http://www.microsoft.com/whdc/device/network/802x/AccessPts/mspx.
S. Schmid et al., "An Access Control Architecture for Microcellular Wireless IPv6 Networks," Proceeding of 26th Annual IEEE Conference on Local Computer Networks, 2001, pp. 454-463.
Notice of Allowance in Application U.S. Appl. No. 10/631,898, mailed Aug. 12, 2010.
Office Action in U.S. Appl. No. 10/458,628, mailed Aug. 2, 2010.
Office Action issued in USPTO in copending U.S. Appl. No. 10/631,898, dated Feb. 18, 2010.
Office Action issued by USPTO in copending U.S. Appl. No. 10/458,628, dated Jun. 1, 2007.
Office Action issued by USPTO in copending U.S. Appl. No. 10/458,628, dated Nov. 30, 2007.
Office Action issued by USPTO in copending U.S. Appl. No. 10/458,628, dated Aug. 15, 2008.
Office Action issued by USPTO in copending U.S. Appl. No. 10/458,628, dated Feb. 26, 2009.
Office Action issued by USPTO in copending U.S. Appl. No. 10/631,898, dated Jul. 24, 2007.
Office Action issued by USPTO in copending U.S. Appl. No. 10/631,898, dated Sep. 4, 2008.
Office Action issued by USPTO in copending U.S. Appl. No. 10/631,898, dated Apr. 28, 2009.
Office Action issued by USPTO in copending U.S. Appl. No. 10/631,898, dated Dec. 18, 2009.
Office Action issued by USPTO in copending U.S. Appl. No. 10/654,417, dated Dec. 15, 2006.
Office Action issued by USPTO in copending U.S. Appl. No. 10/654,417, dated Jun. 18, 2007.
Office Action issued by USPTO in copending U.S. Appl. No. 10/654,417, dated Dec. 31, 2007.
Office Action issued by USPTO in copending U.S. Appl. No. 10/654,417, dated Jul. 29, 2008.
Office Action issued by USPTO in copending U.S. Appl. No. 10/654,417, dated Feb. 27, 2009.
Office Action issued by USPTO in copending U.S. Appl. No. 10/654,417, dated Sep. 4, 2009.
Hayes et al., Authenticated VLANs: Secure Network Access at Layer 2, Alcatel Telecommunications Review, pp. 280-286 (2002).
Michele Wright, "Using Policies for Effective Network Management", International Journal of Network Management, pp. 1-8, John Wiley & Sons, Ltd. (1999).
Notice of Allowance from U.S. Appl. No. 10/654,417, dated Apr. 22, 2010.
Peter J. Welcher, "Switching: MultiLayer Switching", pp. 1-9, 1999.
Office Action issued in U.S. Appl. No. 10/458,628, dated Oct. 8, 2009.
Office Action issued in U.S. Appl. No. 10/458,628, dated Mar. 24, 2010.
Office Action issued in U.S. Appl. No. 10/654,417, dated Mar. 24, 2010.
U.S. Appl. No. 12/769,626, filed Apr. 28, 2010.
U.S. Appl. No. 12/869,602, filed Aug. 26, 2010.
Notice of Withdrawal of Notice of Allowance in U.S. Appl. No. 10/631,898, mailed Sep. 16, 2010.
Office Action in U.S. Appl. No. 10/458,628, mailed Nov. 16, 2010.
Notice of Allowance in U.S. Appl. No. 10/631,898, mailed Dec. 7, 2010.
Office Action in U.S. Appl. No. 12/769,626, mailed Oct. 24, 2011.
Office Action in U.S. Appl. No. 12/478,229, mailed on Sep. 28, 2011.
Office Action in U.S. Appl. No. 12/392,422, mailed on Oct. 3, 2011.
Singhal, S. K., "Understanding Wireless LAN Security: A comprehensive Solution Through the ReefEdge Connect System," Reef Edge TechZone, 2003, 16 pages.
Office Action in U.S. Appl. No. 12/769,626, mailed Jul. 12, 2011.
Office Action in U.S. Appl. No. 10/458,628, mailed Apr. 28, 2011.
Office Action in U.S. Appl. No. 10/458,628, mailed Dec. 8, 2006.
Office Action in U.S. Appl. No. 10/654,417, mailed Dec. 15, 2006.
Office Action in U.S. Appl. No. 12/869,602, mailed Mar. 13, 2012.
"HP Procurve Series 5300xl Switches," Management and Configuration Guide, HP Invent, Apr. 2003, 757 pages.
IEEE, "Part 3: Carrier Sense Multiple Access With Collision Detection (CSMA/CD) Access Method and Physical Layer Specifications," IEEE Std 802.3, 1998 Edition, 1998, pp. 36-40.
IEEE, "IEEE Standard for Local and Metropolitan Area Networks—Port-Based Network Access Control," IEEE Std 802.1X-2001, The Institute of Electrical and Electronics Engineers, Inc., Jul. 13 2001, 142 pages.
Office Action for U.S. Appl. No. 12/827,235, mailed Nov. 21, 2011.
Notice of Allowance for U.S. Appl. No. 12/392,422, mailed on Dec. 14, 2011.
Office Action in U.S. Appl. No. 10/458,628, mailed Sep. 7, 2011.
Notice of Allowance in U.S. Appl. No. 12/869,602, mailed Apr. 11, 2012.
Office Action in U.S. Appl. No. 10/458,628, mailed Apr. 17, 2012.
Notice of Allowance in U.S. Appl. No. 12/769,626, mailed Jun. 25, 2012.
Glenn, M., "A Summary of DoS/DDoS Prevention, Monitoring and Mitigation Techniques in a Service Provider Environment," SANS Institute, InfoSec Reading Room, Aug. 21, 2003, GSEC Practical Version 1.4b, Option 1, 36 pages.
Haviland, G. "Designing High-Performance Campus Intranets with Multilayer Switching," White Paper, Cisco Systems, Inc., 1998, 33 pages.

Pfleeger, C. P., "Security in computing," 2nd Edition, 1996, pp. 426-434.
Gill, S., "Catalyst Secure Template," Ver. 1.21, Team Cymru Research NFP, Nov. 2002, 19 pages; URL: http://www.cymru.com/gillsr/documents/catalyst-secure-template.htm.
"Virtual LAN Security Best Practices," Cisco Systems, Inc., Jan. 2006, 13 pages.
Office Action for U.S. Appl. No. 10/631,091, mailed on Jan. 12, 2007.
Office Action for U.S. Appl. No. 10/631,091, mailed Jul. 24, 2007.
Office Action for U.S. Appl. No. 10/631,091, mailed on May 28, 2008.
Office Action for U.S. Appl. No. 10/631,091, mailed on Oct. 28, 2008.
Notice of Allowance for U.S. Appl. No. 10/631,091 mailed on Apr. 24, 2009.
Office Action for U.S. Appl. No. 10/631,366, mailed on Feb. 2, 2007.
Office Action for U.S. Appl. No. 10/631,366, mailed on Oct. 10, 2007.
Office Action for U.S. Appl. No. 10/631,366, mailed on Jul. 17, 2008.
Notice of Allowance for U.S. Appl. No. 10/631,366, mailed on Jan. 13, 2009.
Office Action for U.S. Appl. No. 10/668,455, mailed on Mar. 20, 2009.
Office Action for U.S. Appl. No. 10/668,455, mailed Nov. 16, 2009.
Notice of Allowance for U.S. Appl. No. 10/668,455, mailed on Jun. 1, 2010.
Office Action for U.S. Appl. No. 10/850,505, mailed on Dec. 7, 2007.
Office Action for U.S. Appl. No. 10/850,505, mailed on Jun. 12, 2008.
Notice of Allowance for U.S. Appl. No. 10/850,505, mailed on Jan. 14, 2009.
Notice of Allowance for U.S. Appl. No. 10/850,505, mailed on Sep. 4, 2008.
Office Action for U.S. Appl. No. 12/392,398, mailed on Sep. 1, 2010.
Office Action for U.S. Appl. No. 12/392,398, mailed on Jan. 20, 2011.
Notice of Allowance for U.S. Appl. No. 12/392,398, mailed on Apr. 29, 2011.
Office Action for U.S. Appl. No. 12/478,229, mailed on Jan. 21, 2011.
Office Action for U.S. Appl. No. 12/478,229, mailed on Jun. 29, 2011.
Office Action for U.S. Appl. No. 12/478,216, mailed on Sep. 13, 2010.
Requirement for Restriction/Election for U.S. Appl. No. 12/478,216, mailed on Jan. 18, 2011.
Notice of Allowance for U.S. Appl. No. 12/478,216, mailed on May 5, 2011.
Requirement for Restriction/Election for U.S. Appl. No. 12/392,422, mailed on Apr. 14, 2011.
Office Action for U.S. Appl. No. 12/392,422, mailed on May 24, 2011.
Civil Action CV10-03428—First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 237 pages, with Exhibits A through P, 237 pages.
Civil Action CV10-03428—Defendant, David Cheung's Answer to Plaintiff's First Amended Complaint, filed Nov. 11, 2010, 32 pages.
Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 13, 2011, 238 pages, with Exhibits A through P, 238 pages.
Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 29, 2011, 42 pages.
Civil Action CV10-03428—A10 Networks, Inc.'s, Lee Chen's, Rajkumar Jalan's, Ron Szeto's, Liang Han's, and Steve Hwang's Answer to Third Amended Complaint, Affirmative Defenses, and A10's Counterclaims, Filed May 16, 2011, 40 pages.
Civil Action CV10-03428—Plaintiffs and Counterclaim Defendants Brocade Communications Systems, Inc. and Foundry Networks, LLC's Answer to Defendant A10 Networks, Inc.'s Counterclaims, Filed May 27, 2011, 12 pages.
Office Action in U.S. Appl. No. 10/458,628, mailed Nov. 2, 2011.
Office Action in U.S. Appl. No. 10/458,628, mailed Oct. 4, 2012.
Office Action in U.S. Appl. No. 10/458,628, mailed Mar. 28, 2013.
Phaal et al., "InMon Corporation's sFlow: A Method for Monitoring Traffic in Switched and Routed Networks," Network Working Group Sep. 2001, pp. 1-29 available at http://www.ietf.org/rfc/rfc3176.txt.
U.S. Appl. No. 10/107,749, filed on Mar. 26, 2002.
U.S. Appl. No. 13/184,748, filed on Jul. 18, 2011.
Kwan, "IronShield Best Practices Management VLANs," White Paper, ver. 1.0.0, published Apr. 2003, 23 pages.
Notice of Inter Partes Reexamination Request Filing Date for Control No. 95/001,811, mailed on Nov. 17, 2011.
Notice of Assignment of Inter Partes Reexamination Request for Control No. 95/001,811, mailed on Nov. 17, 2011.
Request for Inter Partes Reexamination of U.S. Patent No. 7,774,833 for U.S. Appl. No. 95/001,811, filed on Nov. 8, 2011.
Office Action for U.S. Appl. No. 12/827,235, mailed on Sep. 17, 2012.
Order Granting Reexamination of U.S. Patent No. 7,774,833, for U.S. Appl. No. 90/011,769, mailed on Aug. 26, 2011, 12 Pages.
Office Action in Ex Parte Reexamination for Control No. 90/011,769, mailed on Feb. 16, 2012.
Advisory Action for U.S. Appl. No. 10/631,366, mailed on Mar. 28, 2008.
Advisory Action for U.S. Appl. No. 10/631,091, mailed on Aug. 13, 2008.
Office Action in Inter Partes Reexamination for Control No. 95/001,811, mailed on Feb. 1, 2012.
Requirement for Restriction/Election for U.S. Appl. No. 10/631,091, mailed on Feb. 20, 2008.
Notice of Allowance for U.S. Appl. No. 12/478,229, mailed on Jul. 5, 2012.
Reexamination Documents for U.S. Patent No. 7,774,833, filed Jun. 27, 2011, 789 pages, included: Request for Reexamination Transmittal Form; Request for Ex Parte Reexamination; Form PTO/SB/08; Exhibit A—U.S. Patent No. 7,774,833; Exhibit B—HP Procurve Series 5300XL Switches, Management and Configuration Guide, Hewlett-Packard Company, Edition 7, published Apr. 2003.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint, filed A10 Networks, Inc., Lee Chen, Rajkumar Jalan, Ron Szeto, filed Oct. 11, 2010, 30 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages. Included: Proposed Order.
Civil Action CV10-03428—Order by Judge Lucy H. Koh granting in part and denying in part Motion to Dismiss First Amendment Complaint, filed Mar. 23, 2011, 19 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.

Civil Action—CV10-03428—Complaint for Patent Infringement, Trade Secret Misappropriation, Breach of Contract, Interference with Contract, and Unfair Competition Under Cal. Bus. & Prof. Code §§ 17200 et seq., filed on Aug. 4, 2010, with Exhibits A through M, 196 pages.

Civil Action CV10-03428—Answer to Plaintiffs Brocade Communications Systems, Inc. and Foundry Networks, LLC's Counterclaims, filed by A10 Networks, Inc., filed Jun. 17, 2011, 4 pages.

Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages, Included: Affidavit Declaration of Scott R. Mosko in Support of Motion; Proposed Order, Exhibits 1 and 2.

Civil Action CV10-03428—Opposition to Motion to Stay Proceedings Pending Reexaminations, filed by Brocade Communications Systems, Inc., Foundry Networks, LLC, filed Jul. 15, 2011, 20 pages Included; Proposed Order.

Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC filed Jul. 15, 2011, 70 pages. Included Exhibits A through E.

Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included Declaration of Scott R. Mosko, Exhibits A, C, and D.

Civil Action CV10-03428—Memorandum in Support of Motion for Temporary Restraining Order and Preliminary Injunction [REDACTED VERSION] filed by Brocade Communications Systems, Inc., Foundry Networks, LLC, filed Jul. 28, 2011, 34 pages. Included: Proposed Order for Temporary Restraining Order and Order to Show Cause and Proposed Preliminary Injunction.

Civil Action CV10-03428—Declaration of Andrew (Andy) Guerrero in Support of Motion for Temporary Restraining Order [REDACTED VERSION] of Plaintiffs' Memorandum in Support of Motion for Temporary Restraining Order and Preliminary Injunction [REDACTED VERSION] Andrew(Andy) Guerrero ISO Plaintiffs' Motion for TRO and Preliminary Injunction, filed by Brocade Communications Systems, Inc., Foundry Networks, LLC, filed Jul. 26, 2011, 3 pages.

Civil Action CV10-03428—Declaration of Fabio E. Marino in Support of Motion for Temporary Restraining Order [REDACTED VERSION] of Plaintiffs' Memorandum in Support of Motion for Temporary Restraining Order and Preliminary Injunction [REDACTED VERSION] of Declaration of Fabio E. Marino ISO Plaintiffs' Motion for TRO and Preliminary Injunction, filed by Brocade Communications Systems, Inc., Foundry Networks, LLC, filed Jul. 26, 2011, 2 pages.

Civil Action CV10-03428—Declaration of Keith Stewart in Support of Motion for Temporary Restraining Order [REDACTED VERSION] of Plaintiffs' Memorandum in Support of Motion for Temporary Restraining Order and Preliminary Injunction [REDACTED VERSION] of Declaration of Fabio E. Marino ISO Plaintiff' Motion for TRO and Preliminary Injunction, filed by Brocade Communications Systems, Inc., Foundry Networks, LLC, filed Jul. 26, 2011, 5 pages.

Civil Action CV10-03428—Declaration of Mani Prasad Kancherla in Support of Motion for Temporary Restraining Order [REDACTED VERSION] of Plaintiffs' Memorandum in Support of Motion for Temporary Restraining Order and Preliminary Injunction [REDACTED VERSION] of Declaration of Fabio E. Marino ISO Plaintiffs' Motion for TRO and Preliminary Injucntion, filed by Brocade Communications Systems, Inc., Foudry Networks, LLC, filed Jul. 26, 2011, 5 pages.

Civil Action CV10-03428—Declaration of Prasad Aluri in Support of Motion for Temporary Restraining Order [REDACTED VERSION] of Plaintiffs' Memorandum in Support of Motion for Temporary Restraining Order and Preliminary Injunction [REDACTED VERSION] of Declaration of E Fabio E. Marino ISO Plaintiffs' Motion for TRO and Preliminary Injunction, filed by Brocade Communications Systems, Inc., Foundry Networks, LLC, filed Jul. 26, 2011, 3 pages.

Civil Action CV10-03428—Declaration of Robert D. Young in Support of Motion for Temporary Restraining Order [REDACTED VERSION] of Plaintiffs' Memorandum in Support of Motion for Temporary Restraining Order and Preliminary Injunction [REDACTED VERSION] of Declaration of Fabio E. Marino ISO Plaintiffs' Motion for TRO and Preliminary Injunction, filed by Brocade Communications Systems, Inc., Foundry Networks, LLC, filed Jul. 26, 2011, 46 pages.

Civil Action CV10-03428—Declaration of Lisa McGill in Support of Motion for Temporary Restraining Order [REDACTED VERSION] of Plaintiffs' Memorandum in Support of Motion for Temporary Restraining Order and Preliminary Injunction [REDACTED VERSION] of Declaration of Fabio E. Marino ISO Plaintiffs' Motion for TRO and Preliminary Injunction, filed by Brocade Communications Systems, Inc., Foundry Networks, LLC, filed Jul. 26, 2011, 506 pages.

Civil Action CV10-03428—Brocade's Opposition to Defendant's Motion to stay Proceedings Pending Reexaminations, filed Dec. 7, 2011, 18 pages.

Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.

Civil Action CV10-03428—Order Construing Disputed Claim Terms of U.S. Patent Nos. 7,647,427; 7,716,370; 7,558,195I 7,454,500; 7,581,009; 7,657,629; 7584,301; 7,840,678; and 5,875,185, filed Jan. 6, 2012, 33 pages.

Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 4 pages.

Civil Action CV10-03428—Plaintiffs' Reply Memorandum in Further Support of Motion for Temporary Restraining Order and Preliminary Injunction [REDACTED VERSION] filed by Brocade Communications Systems, Inc., Foundry Networks, LLC, filed Aug. 4, 2011, 22 pages.

Civil Action CV10-03428—Notice of Errata re Reply Memorandum in Further Support of Motion for Temporary Restraning Order and Preliminary Injunction by Brocade Communications Systems, Inc., Foundry Networks, LLC, filed Aug. 5, 2011, 2 pages.

Civil Action CV10-03428—Notice of Granted Requests for Reexamination of Patents 7,558,195, 7,657,629, 7,840,678, Filed Aug. 5, 2011, 316 pages.

Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Informaiton Under Seal; granting Motion for Leave to File Supplemental Authority, filed Aug. 12, 2011, 2 pages.

Civil Action CV10-03428—Order Denying Motion for Temporary Restraining Order [REDACTED VERSION] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.

Civil Action CV10-03428—Joint Claim Construction, Filed Aug. 26, 2011, 29 pages.

Civil Action CV10-03428—Notice of Granted Requests for Reexamination of Patents 7,774,833; 5,454,500; 7,899,899; 7,754,965; 7,647,427; and 7,716,370, Filed Sep. 6, 2011, 72 pages. Included: Exhibits A through F.

Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, No Filing Date, 779 pages. Included: Exhibits A through M. (due to size, reference will be uploaded in two parts).

Civil Action CV10-03428—REDACTED Declaration of David Klausner in Support of Opposition to Plaintiffs' Motion for Temporary Restraining Order and Preliminary Injunction, by A10 Networks, Inc., filed Sep. 28, 2011, 9 pages.

Civil Action CV10-03428—Redacted Declaration of Dr. Chi Zhang in Support of Opposition to Plaintiffs' Motion for Temporary Restraining Order and Preliminary Injunction, by A10 Networks, Inc., filed Sep. 28, 2011, 4 pages.

Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.

Civil Action CV10-03428—Declaration of Teri H.P. Nguyen in Support of Motion for Partial Summary Judgment Notice of Motion and Motion for Partial Summary Judgment on Assignor Estoppel filed by Brocade Communications Systems, Inc., Foundry Networks, LLC, filed Oct. 11, 2011, 259 pages. Included Exhibits A through R.

Civil Action CV10-03428—Initial Claim Construction Brief, filed by Brocade Communications Systems, Inc., Foundry Networks, LLC, filed Oct. 11, 2011, 31 pages.

Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.

Civil Action CV10-03428—Order by Judge Lucy H. Koh denying Motion for Leave to File Excess Pages and Striking Plaintiffs' Motion for Summary Judgment on Infringement, filed Oct. 18, 2011 2 pages.

Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel filed, by A10 Networks, Inc., Lee Chen, Rajkumar Jalan, Ron Szeto, filed Nov. 8, 2011, 17 pages.

Civil Action CV10-03428—Responsive Claim-Construction Brief (PLR 4-5(b)) by A10 Networks, Inc., Lee Chen, Rajkumar Jalan, filed Nov. 15, 2011, 28 pages.

Civil Action CV10-03428—Declaration of Scott R. Mosko in Support of Defendant and Counterclaimant Al 0 Networks, Inc.'s and Defendants Lee Chen's and Rajkumar Jalan's Reponsive Claim Construction Brief (PLR 4-5(b)) filed Rajkumar Jalan, filed by A10 Networks, Inc., Lee Chen, Rajkumar Jalan, filed Nov. 15, 2011, 70 pages.

Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.

Civil Action CV10-03428—Administrative Motion to Consider Whether Cases Should be Related, filed by Brocade Communications Systems, Inc., Foundry Networks, LLC, filed Nov. 21, 2011, 8 pages, including Declaration and Proposed Order.

Civil Action CV10-03428—Reply Claim Construction Brief filed by Brocade Communications Systems, Inc., Foundry Networks, LLC, filed Nov. 22, 2011, 22 pages.

Civil Action CV10-03428—Declaration of Nitin Gambhir in Support of Reply Claim Construction Brief, filed by Brocade Communications Systems, Inc., Foundry Networks, LLC, filed Nov. 22, 2011. 12 pages. Included Exhibit A.

Civil Action CV10-03428—Motion to Stay Defendant and Counterclaimant A10 Networks, Inc.'s and Defendants Lee Chen's, Rajkumar Jalan's, Ron Szeto's and Steve Hwang's—Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages Included: Proposed Order.

Civil Action CV10-03428—Declaration of Scott A. Herbst Declaration of Scott A. Herbst in Support of Defendant and Counterclaimant A10 Networks, Inc.'s and Defendants Lee Chen's, Rajkumar Jalan's, Ron Szeto's, and Steve Hwang's Renewed Motion to Stay All Proceedings Pending Inter Partes Reexamination (All Patents Asserted by Plaintiffs) Filed by A10 Networks, Inc., Lee Chen, Steve Hwang, Rajkumar Jalan, Ron Szeto, filed Nov. 23, 2011, 25 pages Included: Exhibits 1 through 6.

Civil Action CV10-03428—Litigation Docket, printed on Nov. 26, 2011, 44 pages.

Office Action in U.S. Appl. No. 13/461,519, mailed May 3, 2013.

* cited by examiner

SYSTEM AND METHOD FOR FLEXIBLE AUTHENTICATION IN A DATA COMMUNICATIONS NETWORK

RELATED APPLICATIONS

The present application claims benefit from U.S. Provisional Patent Application Ser. No. 60/527,266, filed Dec. 5, 2003, entitled SYSTEM AND METHOD FOR FLEXIBLE AUTHENTICATION, which is incorporated herein by reference.

FIELD OF THE INVENTION

The present invention is generally directed to data communication networks, and in particular to security features which provide for flexible methods of authentication.

BACKGROUND

As security requirements increase, network port authentication technology will be increasingly called upon to provide additional layers of security. Authentication is one of the security layers that can be provided by networking switches to increase the security of corporate networks. Authentication is not new and has been provided by networking equipment in a number of different ways.

One widely known and utilized way for providing for authentication utilizes IEEE 802.1X authentication. Strong authentication using the IEEE 802.1X standard relies on Extensible Authentication Protocol (EAP) to secure the authentication information passed between the client (supplicant) and the authentication server, where the server is frequently a Remote Authentication Dial-In User Service (RADIUS server).

Another approach is to provide for security based on the physical address, such as a Media Access Control (MAC) address for a device. The discussion herein will frequently refer to a MAC address for a device, but it should be recognized that other forms of a physical address for a device might also be used. Where the MAC address is used for port security, the network port can be locked down to a particular MAC address or series of MAC addresses. The MAC addresses can be statically assigned or dynamically learned for specified number of MAC addresses per port.

Another approach for providing for authentication security uses WEB Authentication. Where Web authentication is used, the network access device, or switch, secures the port by making all clients authenticate by entering user credentials which are validated against an Authentication Server. The client uses a WEB browser to allow the client to enter the user credentials.

As recognized by the inventors herein there are a number of disadvantages to some of the systems that utilize a single one of the above authentication methods. For example, while IEEE 802.1X can provide for a reasonably high degree of security, utilization of 802.1X requires an 802.1X supplicant (client software) to be installed on all client hosts wishing to access the network. To many network managers and IT professionals, 802.1X port based authentication is often too cumbersome. It requires planning, resources for rollout of the 802.1X supplicant, high levels of user education, and ongoing maintenance. These requirements can significantly increase system operational costs.

MAC port security, which uses MAC address authentication, is an authentication method that is tied to a device and not an individual. Many security professionals and security conscious IT Managers view this form of port authentication as weak—as MAC addresses are easily snooped and spoofed by users understanding the technology. Traditional MAC authentication using only the MAC address has been used in past, but this method is flawed and cannot be called a true authentication system due to the inherent weaknesses. By performing some simple common TCP/IP commands, a hacker can easily discover the MAC address belonging to a particular host. Using widely known routines such as PING and ARP, the target's MAC address can easily be revealed, allowing the hacker to assume the identity of another device to easily gain access to the network.

In addition to the spoofing weakness, MAC Authentication does not identify the user who is using the device. Audit logs cannot identify the user but only the device (and the device's identification may not be accurate due to spoofing). To many IT professionals, MAC Authentication is one of the weakest forms for authentication and is considered suitable for casual access control only.

In many instances, where WEB Authentication is utilized, the Web authentication communications are usually secured using an SSL tunnel protocol which secures the credential information being passed between the host or supplicant and the Authentication Server. WEB Authentication is one of the simplest forms of authentication and requires the least amount of user education as WEB browsers are common applications found on every modern personal computer platform. WEB Authentication can be stronger than MAC Authentication but is generally weaker than the IEEE 802.1X Authentication method due to the ability to circumvent the authentication method by using common hacking methods such as replay attacks.

Another issue with WEB Authentication is the management of user credential information—such as Usernames and Passwords. Many IT managers of large universities and colleges have experienced implementation and maintenance problems of these systems due to the difficulty of managing thousands of user accounts and passwords.

DETAILED DESCRIPTION

It has been recognized by the present inventors that it would be advantageous to provide a method and system which allows a system manager to select and choose between different combinations of authentication technologies. An embodiment of the system and method herein allows a user to customize the authentication methods by programming the network access device, such as a switch, to prompt the user for various authentication credentials. Credential information can include various types of information which can be used to identify a user such as a user identification number, a user name, and user password etc. The system and method allow for a network access device to be adapted, or programmed, such that a system administrator can select between a number of different authentication methods, depending on the environment in which the network access device is operating. The network access device can be a device such as switch which operates to determine the routing of data packets transmitted from a host client device. Generally, a switch is a layer 2 device, where layer 2 is defined by the Open Systems Interconnection (OSI) model. This model is discussed in detail in the International Standards Organization, standard ISO/IEC 7498, which defines a 7-layer model for describing interconnected systems, which is incorporated herein by reference in its entirety. Further as discussed herein the network access device of the present invention which can be switch, and it should be noted that a switch described herein can include not just the operations of regarding layer 2 functions, but can further include the capability of providing some layer 3 functions, where layer 3 functions include determining source IP address hosts and analyzing this information. By allowing the system administrator to select between a number of different authorization processes. The network access device's operation can be adjusted to provide a level of authentication and complexity as is appropriate for a particular operation environment.

For an authentication technology to be flexible, the system administrator will be able to program the network access device to perform different types of authentication operations. In one embodiment the programming can be as simple as the system selecting between of a plurality of different authentication methods.

Figure 1:
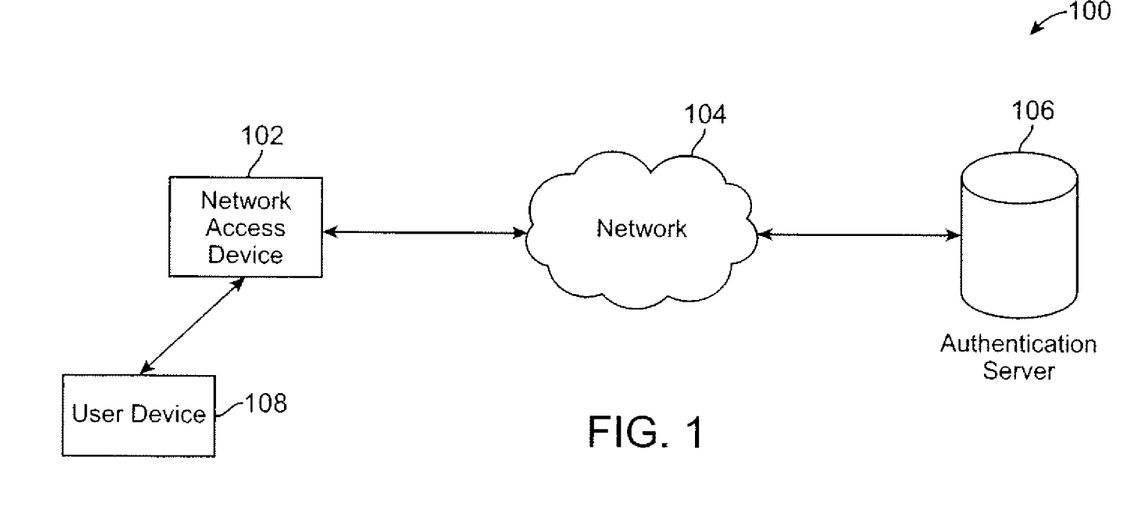
FIG. 1 shows an overview of a data communications network.

FIG. 1 shows basic elements of a network in accordance with an embodiment of the present invention. As shown in FIG. 1, system 100 comprises a data communications network 104, a network access device 102 and an authentication server 106 each of which is communicatively coupled to data communications network 104, and a host user device 108 communicatively coupled to network access device 102.

Data communications network 104 can include a plurality of network nodes interconnected via a wired and/or wireless medium, wherein each node consists of a device capable of transmitting or receiving data over data communications network 104. In one embodiment, data communications network 104 comprises a conventional local area network ("LAN") that employs an Ethernet communication protocol in accordance with the IEEE 802.3 standard for data link and physical layer functions. However, the invention is not so limited, and data communications network 104 may comprise other types of wired or wireless networks, including but not limited to a wide area network ("WAN"), and other types of communication protocols, including but not limited to ATM, token ring, ARCNET, or FDDI (Fiber Distributed Data Interface) protocols.

Network access device 102, which preferably includes network switch functions, comprises a plurality of ports for communicatively interconnecting network devices to each other and to data communications network 104. Network access device 102 is configured to channel data units, such as data packets or frames, between any two devices that are attached to it up to its maximum number of ports. In terms of the International Standards Organization's Open Systems Interconnection (OSI) model, network access device 102 performs layer 2, or data link layer, functions. In particular, network access device 102 examines each received data unit and, based on a destination address included therein, determines which network device the data unit is intended for and switches it out toward that device. In the embodiment described herein, the destination address comprises a physical or Media Access Control (MAC) address of a destination device. Further, as discussed above the network access device can also provide some layer 3 functionality.

Figure 2:
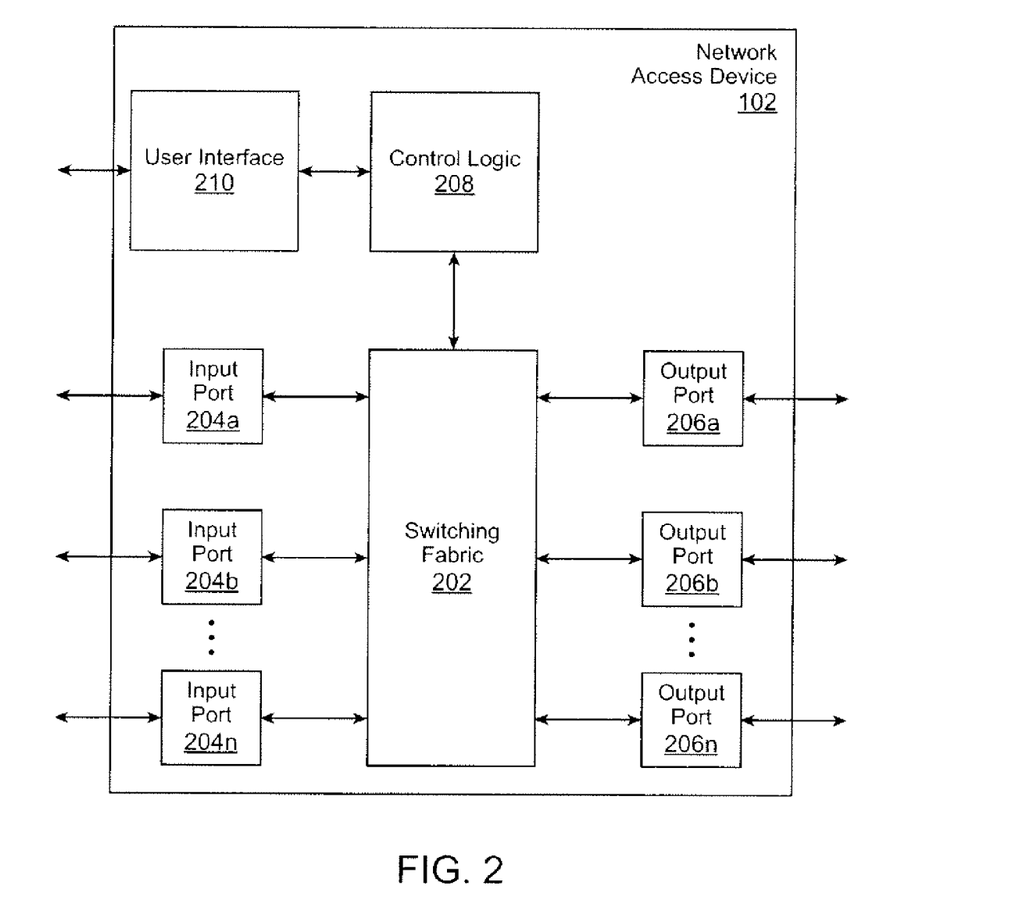
FIG. 2 shows an embodiment of a network access device herein.

FIG. 2 depicts an exemplary high-level architecture of network access device 102 in accordance with an embodiment of the present invention. As shown in FIG. 2, network access device 102 comprises a plurality of input ports, 204a through 204n, that are coupled to a plurality of output ports, 206a through 206n, via a switching fabric 202. Network access device 102 also includes control logic 208 for controlling various aspects of switch operation and a user interface 210 to facilitate communication with control logic 208. User interface 210 provides a means for a user, such as a system administrator, to reconfigure network access device 102 and adjust operating parameters. In one embodiment as described in more detail below, the system administrator can access the control logic through the user interface, and select between different levels of authentication, where different levels of authentication can be programmed into the control logic of the switch and the system administrator can select between the different levels of authentication. Additionally, through the user interface, the system administrator could provide specific customized authentication programming to the control logic of the network access device.

In operation, data units (e.g., packets or frames) are received and optionally buffered on one or more of input ports 204a through 204n. Control logic 208 schedules the serving of data units received by input ports 204a through 204n in accordance with a predetermined scheduling algorithm. Data units are then served to switching fabric 202, which routes them to the appropriate output port 206a through 206n based on, for example, the destination address of the data unit. Output ports 206a through 206n receive and optionally buffer data units from switching fabric 202, and then transmit them on to a destination device. In accordance with an embodiment of the present invention, network access device 102 may also include logic for performing routing functions (layer 3 or network layer functions in OSI).

With further reference to FIG. 1, a client device 108 is shown connected to one of the ports of network access device 102. Client device 108 may comprise a. personal computer (PC), laptop computer, Voice Over Internet Protocol (VoIP) phone, a wireless access point, or any other device capable of transmitting or receiving data over a data communications network, such as data communications network 104.

Authentication server 106 comprises a computer that stores application software and a database of profile information for performing a user authentication protocol. In an embodiment, authentication server 106 comprises a server that uses the Remote Authentication Dial-In User Service (RADIUS) as set forth in Internet Engineering Task Force (IETF) Request For Comments (RFC) 2865 for performing user authentication functions.

In one embodiment of a network access device herein, the control logic can allow for selection between different authentication processes, such that an authentication process can be selected where the network access device will prompt for the traditional username and password, and another process will allow for the MAC Address of the device to be used as the Username credential. In one embodiment if the latter is selected operation is selected, the network access device will automatically detect a host's MAC address and display it on the credential screen for verification, prompting only for the user's password.

Another option can be to select an authentication process programmed to use only the MAC Address as the authentication credential and automate the login process without prompting the user for any passwords. This method can be used with Dynamic VLANs to control where the device may go once authenticated onto the network. Additional aspects of use of dynamic VLANs and user policy assignments are described in U.S. patent application Ser. No. 10/654,417, filed Sep. 4, 2003, entitled, Multiple Tiered Network Security System, Method and Apparatus Using Dynamic User Policy Assignment, which application is assigned to the same assignee as the present application, and which is incorporated herein by reference. Further, aspects of user policy assignments are also discussed in pending U.S. patent application Ser. No. 10/850,505, entitled SYSTEM AND METHOD FOR SOURCE IP ANTI-SPOOFING SECURITY, filed on May 20, 2004, and which is incorporated herein by reference in its entirety.

The network access device can also be configured such that a system administrator can select for different levels of security for communications between the network access device and an authentication server, where such communications are required to process the user's credential information. For example, a system administrator could be provided with a choices where the communications between the network access device and the authentication server would accommodate traditional RADIUS operations of older legacy systems, or a system administrator could select a mode of operation providing for a high level of security between the network access device and the authentication server, where such communications would be in accordance with IEEE 802.1X RADIUS using EAP-MD5 for higher security. For providing the capability of communications between the network access device and the authentication server which utilizes IEEE 802.1x, the network access device control logic can be loaded with 802.1x supplicant software. As is widely known in the art the supplicant for 802.1x communications is a software agent, that operates to facilitate 802.1x communications, where IEEE 802.1x is a widely known communications protocol. Additional aspects of authentication procedures and use of IEEE 802.1x are described in pending US patent applications: U.S. patent application Ser. No. 10/458,628, filed Jun. 11, 2003, entitled Multiple Tiered Network Security System, Method & Apparatus; and U.S. patent application Ser. No. 10/631,898, filed Aug. 1, 2003, entitled, System & Apparatus for providing Multiple Access Modes in a Data; both of these applications are assigned to the same assignee as the present application, and are incorporated herein in by reference.

Depending on the needs of the operating environment each network access device is adapted so that a system administrator can select from a range of authentication processes, and further additional processes could be programmed to allow for additional credential and backend processing techniques to satisfy the customer's authentication requirements. Because MAC addresses are inherently insecure, the system and method herein allows the option of using a password or pin to associate the authentication request to a particular user. By using a MAC address with a user password, the authentication system can provide an audit trail of users tried to gain access with which device. The network access devices can also log the particular network access port that the authentication attempt was made from and record the date and time for completeness.

For low security applications, the MAC Address may be used as the only form of authentication credential without tying the device to a particular user. This would lower the accuracy of the audit trail reports by not associating a user with the device. Syslog and traps can still be sent to log the MAC Address that is being authenticated along with the port information and the data and time of the authentication request. Previous static systems that only use a MAC Address or a Username and Password do not have the flexibility of authenticating both the user and the device.

Figure 3:
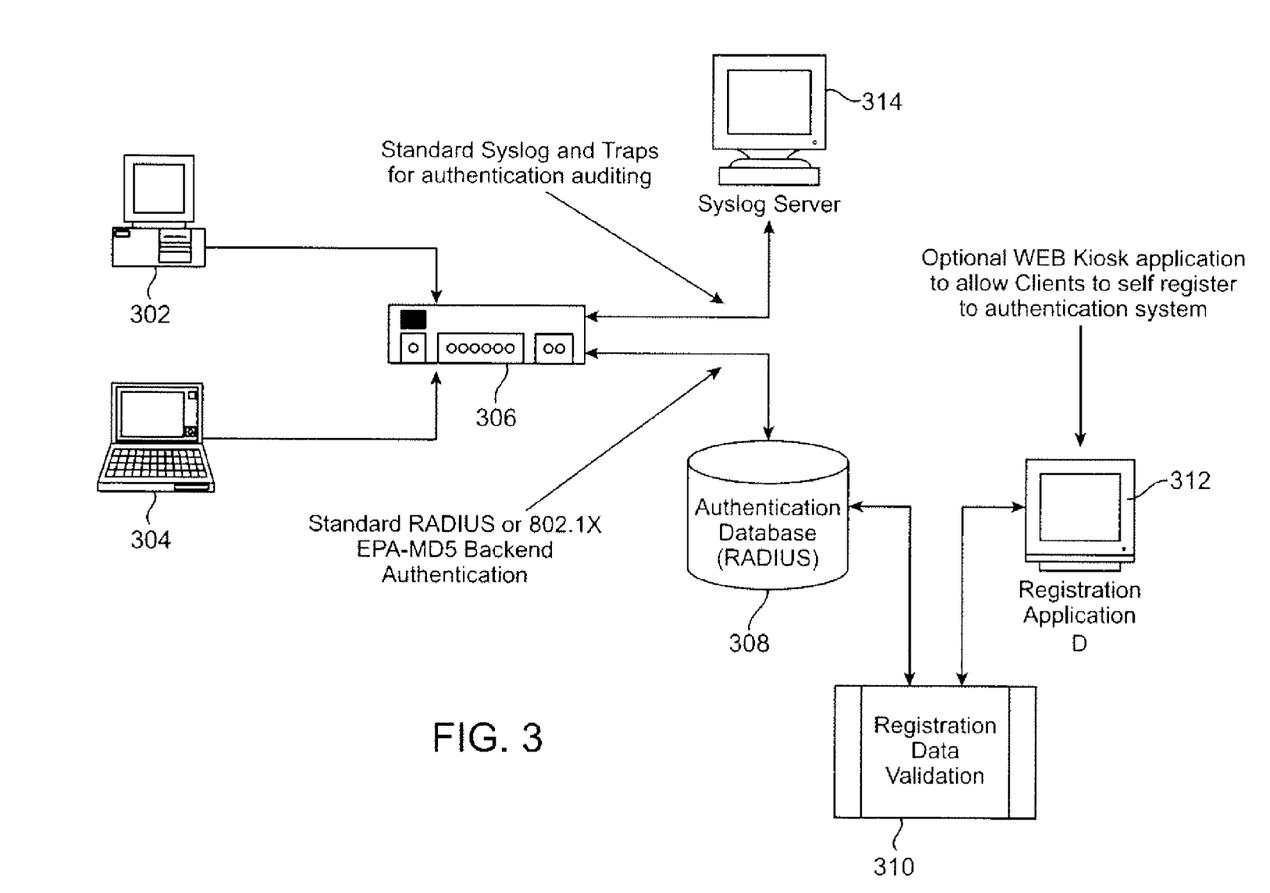
FIG. 3 shows an embodiment of a data communications network of the present invention.

FIG. 3 shows an embodiment of a system 300 herein. This system can include several components: client devices 302 and 304, network access device 306, authentication server 308 having registration validation data 310, and an optional registration kiosk computer 312, and a syslog server 314 for storing and syslog information. Aspects of the operation of these different components are illustrated in connection with the discussion below.

Figure 4:
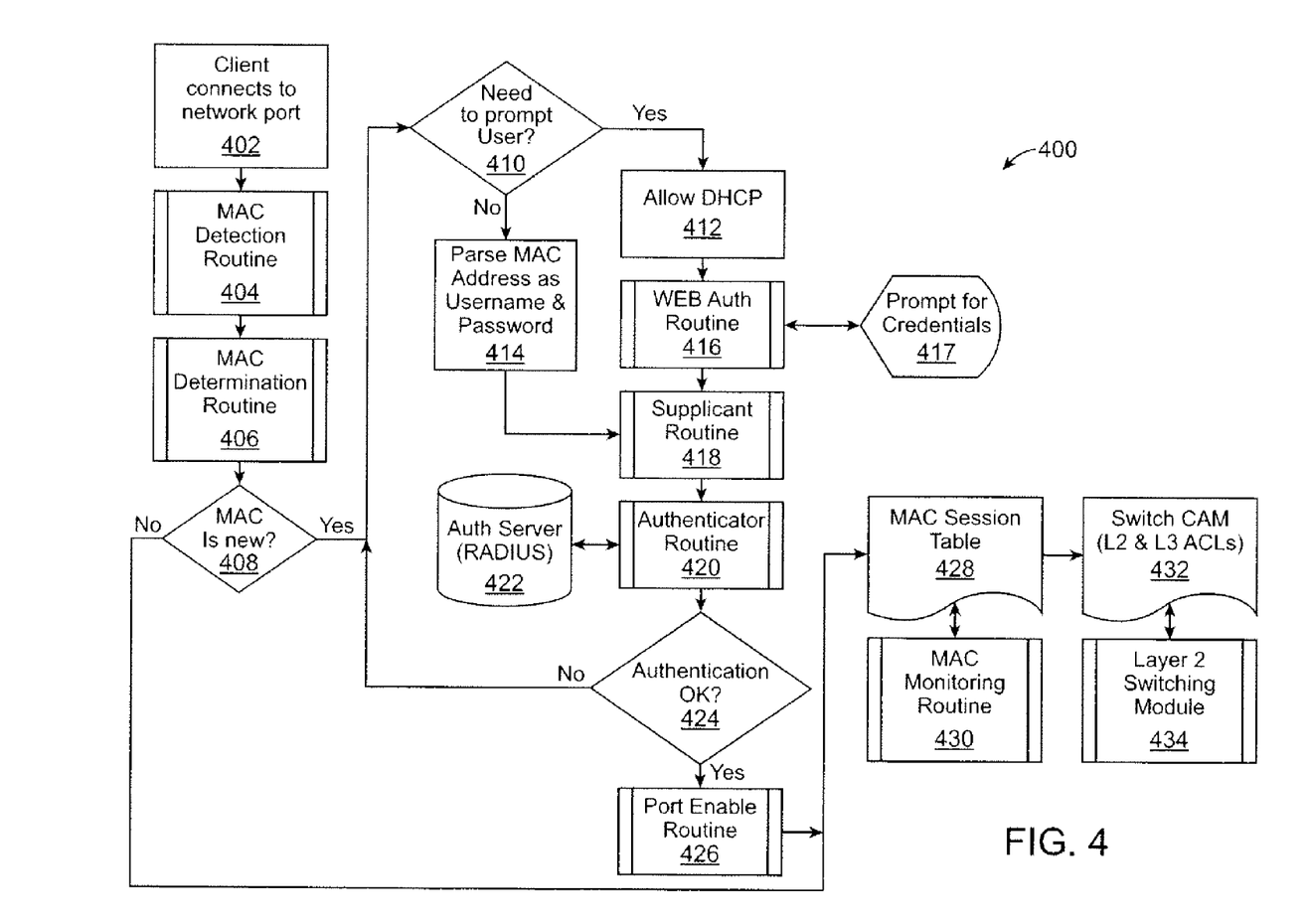
FIG. 4 shows an embodiment of a method of authentication of the present invention.

FIG. 4 illustrates a flow chart 400 of a flexible network security method in accordance with the present invention. At step 402 a new client device connects to the network by linking their computer to a network port of the network access device. At step 404 the network access device detects that a new client has attached to the network port that is enabled using a MAC Detection Routine of the control logic of the network access device. Depending on the authentication process used, all traffic for the MAC Address can be blocked, except for DHCP requests, until the network access device can determine the authentication state of the MAC Address. The MAC Detection Routine is used to discover the client device's MAC Address. It is used when a client's device first attaches to the port and brings the link up on the port or when there is a new MAC address introduced onto a port that has multiple clients associated with it.

At step 406, after the MAC address is has been detected, the MAC Address is passed to a MAC determination routine of the network access device, which determines 408 if the MAC Address is new or if it has already been authenticated. If the MAC Address is new, the network access device blocks all traffic originating from the MAC Address except for DHCP packets. This allows new client to obtain the necessary TCP/IP Address from a DHCP server (not shown) to communicate with the network access device's WEB server. If the MAC Address has already been authenticated, the traffic from client is allowed to flow through the network port in standard Layer 2 fashion.

If the MAC Address is new, the following occurs, and the control logic will make a determination 410 as to whether user credential information is required, as selected per the authentication method selected or programmed by the system administrator. If the network access device is configured to require user credential information then the new client's DHCP requests are passed 412 unblocked through the network access device to a DHCP server attached to the network on an unprotected side of the network. Through communication with the DHCP server a valid DHCP address is received by the new client, and the new client has the ability to communicate with the network access devices web server. This web server could be implemented as part of the network access device, or it could be a separate computer coupled to a port of the network access device.

If the system administrator has selected an option to have the network access device use physical address authentication process with only a MAC Addresses as the authentication criteria, then the MAC Address will be used as the authentication Account ID and password without prompting the user for any other information. In this mode of operation the network access device will parse the MAC address and use it as the user name and password, and proceed to the supplicant routine step 418, which is discussed in more detail below.

Where the network device is operating in a mode that utilizes a combined physical address and web authentication process, which can require user enter credential information, after the new client has MAC address has been determined. In such a mode of operation after determination of the new client devices MAC address, the new client starts a WEB browser session and begins a user credential part of the authentication process. The new client's WEB browser will attempt to contact the WEB page that is programmed into new client as its default home page when the browser is started. The network access device will detect the new client's HTTP (port 80) or HTTS (port 443) traffic and initiate a WEB authentication routine 416, which can include a WEB Redirection to the network access device's WEB Authentication Routine.

The WEB Authentication Routine will return a secure SSL Authentication Screen to the new client. SSL or Secure Sockets Layer technology is a widely known industry-standard method for protecting web communications. The SSL security protocol can provide among other things data encryption and message integrity. Depending on the options selected by the system administrator for the operation of the network access devices control logic, regarding authentication of a new client, the Authentication Screen may prompt 417 for a username and password or display new client's MAC Address and prompt only for a password. In response to the prompting of the authentication screen the user enters the necessary authentication information using the WEB Authentication Screen displayed by the new client's browser. What the user is required to enter will depend on which authentication method was selected.

Once the credentials are received and accepted by the WEB Authentication Routine and passed to the Authentication Server's Supplicant Routine which is a software agent which is loaded on the network access device to facilitate IEEE 802.1x communications by the network access device. The supplicant routine operates 418 to examine the user's credential information to make sure the format is correct. Where the system administrator has selected a mode of operation such that the control logic does not require user credential information, the parsed MAC address information from 414 is used by the supplicant routine. The supplicant routine formulates the necessary packets and inserts the user credentials (where such information was required, or otherwise uses the parsed MAC address information alone) into the packets and passes the authentication information as part of an authentication request to the Authentication Server, shown in FIG. 3 as 308, in the required format.

Depending on the choice of the customer, the network access device can use standard RADIUS authentication calls to a RADIUS Authentication Server or it can use other a more secure authentication technique such as 802.1X and EAP-MD5 to an 802.1X compliant RADIUS server acting as the Authentication Server 308. Where standard RADIUS authentication is used, then a supplicant operation may not be required.

In response to receiving the authentication request, and authentication credential information, the Authentication Server 308 communicates with an authenticator routine 420 of the network access device, and operates to examine 422 the authentication request relative to stored authentication data. The examination results in an accept or deny determination 424 based on the credentials and sends the appropriate Accept or Deny response back to the network access device 306. If the authentication request is successful, the Authentication Server 308 may also return any other pre-programmed values such as Dynamic VLAN information or User Policy information to the network access device.

In response to receiving the response back from the Authentication Server, the control logic of the network access takes different actions depending on whether an accept or deny determination is made. Additionally, the control logic of the network access device can send the Syslog and Trap information to a syslog server 314 to provide an audit record of the new client's authentication request. Depending on whether an accept or deny determination is made the network access device will either grant or deny access to the MAC address of the new client.

If the authentication server response was to deny the new client, a message from the Authenticator Routine is sent to the WEB Authentication Routine and the user is informed, typically via the browser of the new client device, that the credentials entered were incorrect and prompts 417 the user to re-enter the credentials to attempt another authentication request.

If the authentication server response was to allow the new client, the Web authentication routine accepts any other information that was returned (such as VLAN or User Policy information) and passes the information to a Port Enable Routine 426 of the network access device to program 432 the Layer 2 port of the network access device to allow traffic, according the switching module 434 from the new client based on the MAC/IP Pair information for the new client, and a MAC session Table of the network device is updated 428.

The network access device will monitor 430 all MAC/IP address pairs in its MAC/IP Session Table using the MAC Monitoring Routine. In one embodiment if a user removes a host computer from the port and the link is dropped, all host associated with the port are dropped, and corresponding MAC/IP pair information will be removed from the MAC/IP Session Table immediately. If there are multiple clients on the port and the link light is retained by an intermediary device such as another Layer 2 switch or hub, the network access device's MAC Monitoring Routine will watch for continuous traffic from the MAC/IP pair.

After a certain amount of inactivity, the MAC Monitoring Routine will remove the MAC/IP pair from the MAC Session Table to ensure that the MAC/IP pair cannot be used by another device spoofing the original Client's MAC/IP information. This "timeout value" can be set by the end user and will be defaulted to 900 seconds (15 minutes).

In connection with the flow chart above some additional aspects of the operation of a method herein are discussed in more detail as follows. The MAC determination routine which is discussed above in connection with 406 is a routine that is used to validate the MAC Address learned from the MAC Detection Routine. This routine determines if the MAC Address is new or if it is an existing MAC Address that has already been authenticated. The MAC Detection Routine utilizes the MAC Session Table, which in one embodiment would be contained in a memory of the network access device, and would keep track of MAC/IP pairs that have been authenticated by the network access device. For all new MAC Addresses that have been granted access by the Authentication Server 308, the MAC detection Routine creates a new MAC/IP pair entry in the MAC Session Table. For all existing MAC Addresses, it validates the MAC/IP pair information and resets the timeout value to keep the entry "fresh" in the MAC Session Table.

The WEB Authentication Routine 416 is called by the MAC Determination Routine when it identifies a new MAC Address that has not been previously authenticated. This routine displays the proper Authentication WEB Page to the Client's device—prompting for either the Username and Password or displaying the discovered MAC Address and prompting only for the Password. The network manager will have the ability to program the network access device to display the necessary screen to customize their security needs.

The WEB Authentication Routine 416 will accept the credentials entered by a user through a new client, and pass the credentials onto the Supplicant Routine. It will wait for the proper response from the Authentication Routine to display a "Successful Logon" message or and "Access Denied" message. In the case of a successful logon, the Web Authentication Routine is retired after displaying the "Successful Logon" message and the port is programmed with the appropriate information to allow the client's traffic to enter the port with the associated MAC/IP pair information.

In the case of an unsuccessful logon attempt, the WEB Authentication Routine will display the "Access Denied" message and re-prompt the user for authentication information. The Logon Attempts will be monitored by the Authenticator Routine and audit information in the form of Syslog and Trap messages will be sent to the appropriate syslog and trap servers.

The Supplicant Routine 418 is used to parse the credential information entered by the client or passed directly from the MAC Determination Routine. Depending on the backend authentication method selected and programmed by the network manager, the network access device can either use Standard RADIUS calls to authenticate the client or encrypt the authentication messages using IEEE 802.1X EAP-MD5 before sending the authentication messages to the Authentication Server, as discussed above.

The Authenticator Routine 420 is used to communicate the authentication credentials to and from the Authentication Server (RADIUS). It parses the returned traffic from the Authentication Server and determines if the user is allowed or denied access to the network. If there are additional user parameters that are used to control access, such as Dynamic VLAN or User Policy information, the Authenticator Routine parses the optional control information and passes it to the necessary routines to program the port the new client is attached to.

The Port Enable Routine 426 is used to program the physical port of the network access device that the client is attached to. Until the Authenticator Routine receives an Allow message from the Authentication Server, the port is not programmed with the new client's MAC address and an implicit "Deny All" condition on the port is used to block the new client's traffic.

MAC Session Table logic example for physical switch port E10's:

| Port E10 | Allow Authenticated | MAC: 00-03-04-02-f3-4a | IP: 192.168.100.100 |
|---|---|---|---|
| Port E10 | Allow Authenticated | MAC: 00-09-2a-f3-44-31 | IP: 192.168.100.120 |
| Port E10 | Deny Non-Authenticated | MAC: Any | IP: Any |

When the Authenticator Routine 420 receives an Allow message for a client, the new client's MAC/IP address pair is programmed on the network access device port to allow the new client's traffic. The Port Enable Routine will also program any optional control parameters returned from the Authentication Server—such as VLAN or User Policy information. This will allow the port to further control the client's access through the use of VLAN tagging or Layer 3 and/or Layer 4 Access Control Lists (ACLs).

The Port Enable Routine will also be responsible for removing MAC/IP pairs from the port. MAC/IP pairs are removed under two conditions: (1) when the link is dropped on the port—signifying that the client host device has been removed—this locks the port and disables all access until the next Client has been authenticated; and (2) when the MAC Monitoring Routine determines that an authenticated client is no longer transmitting packets (by watching the traffic from MAC/IP pair), the MAC/IP pair will be removed from the MAC Session Table for the port the client was connected to—a timeout value will be set to determine the length of the inactivity.

The MAC Monitoring Routine 430 is responsible for managing the MAP/IP pair information in the MAC Session Table. It monitors the activity from each MAC/IP pair and resets a timeout value as traffic is seen from the client. If the client stops transmitting packets, the MAC Monitoring Routine will increment the timeout value for the MAC/IP pair. After a preset amount of inactivity is reached, default 15 minutes, the MAC Monitoring Routine will clear the inactive MAC/IP pair from the MAC Session Table and clean up any related information that was set for the inactive MAC/IP pair. This information can be control mechanisms such as VLAN or User Policy information.

FIG. 3 shows an optional WEB kiosk server 312 which can be used in connection optional backend routines, that can provide a low overhead authentication system. A Self Registration System can be incorporated into the overall authentication procedure. The WEB Kiosk server 312 can be added to allow Clients to self-register to the system. Depending on the security level required for the environment in which the network is operating, lower security applications can make use of the WEB Kiosk technology to greatly reduce overhead and maintenance. An example where this technology can be used is in University networks where students can register their computers for network access.

To support students, faculty, and guests, the WEB Kiosk can display different category types at the start of the registration process and prompt for the necessary information to validate the user that is trying to register themselves as Student, Faculty, or Guest.

Students can register by entering information similar to the following into the WEB Kiosks. These kiosks may be located in public campus locations such as libraries, registrar offices, cafeterias, and so forth. Registration information could include for example:
  Student Number
  Student Full Name
  MAC Address of Computer
  Desired Account ID
  Desired Password or Pin In order to ensure validity of the student, the Kiosk can send the entered information to a separate Validation Routine. Student numbers can be used to validate that the student full name is accurate and that the student is indeed registered for the semester before completing the registration process and populating the necessary credential information on the Authentication server.

Similarly, faculty can enter specific information to identify themselves to the registration system and register their PC's for network access. Without a student or faculty number, guests can select the GUEST category and enter the following information, for example:
  Full Name
  MAC Address of Computer
  Desired Account ID
  Desired Password or Pin All Guest Accounts can have an automatic expiry date and a pre-determined Dynamic VLAN value to limit Guest access to particular areas of the campus network.

Along with authenticating the User and/or Device using the MAC Address, the network access device could also allow for the capability of being programmed to lock the port down to one particular MAC Address. This would be the first MAC Address that was successfully authenticated to the Authentication Server. By combining the MAC Authentication feature with the MAC Address Locking feature, the client is locked to one particular switch port after they have authenticated to the network. This feature would be valuable for solutions that only want one physical device using one network port at any one time—no intermediary Layer 2 hubs or switches can be used to allow additional devices to share the network port.

It should be recognized that the above embodiments provide examples of the invention, however, various alternative implementations would also be within the scope of the invention. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A system comprising:
   one or more client devices; and
   a network access device comprising:
      a memory configured to store:
         an indication of a selected one of a plurality of different authentication procedures a system administrator of the network access device has selected to perform authentication, the authentication based at least in part on credential information identifying the one or more client devices and credential information identifying users of one or more client devices the plurality of different client authentication procedures comprising a combined physical address and web authentication procedure, comprising transmitting user credential information from a client device toward the network access device according to a secure protocol, and then transmitting the user credential information from the network access device toward an authentication server; and
      control logic configured to, when executed:
         detect that the new client device has attached to a port of the network access device;
         upon detecting the new client device, perform authentication according to the selected one of a plurality of different authentication procedures each supported by the access device; and
         determine whether to grant the new client device access to a data communications network based upon a result of the authentication.

2. The system of claim 1, wherein the combined physical address and web authentication procedure comprises transmitting user credential information from the new client device toward the network access device according to a secure protocol, and then transmitting the user credential information from the network access device toward the authentication server in accordance with IEEE 802.1x.

3. The system of claim 1 wherein the network access device comprises supplicant software so that credential information can be transmitted from the network access device toward an authentication server in accordance with IEEE 802.1x.

4. The system of claim 1, wherein the plurality of different client authentication procedures comprises:
   a physical address authentication procedure; and
   wherein the network access device is configured to, if the physical address authentication procedure is selected,
      determine a physical address for the new client device, and to use physical address information to authenticate the new client device; and
      make a determination as to whether to provide the new client device access to the data communications network based on the physical address of new the client device.

5. The system of claim 1,
   wherein the network access device is configured to, if the combined physical address and web authentication procedure is selected, provide the new client device with limited access to the data communications network, to allow the new client device to communicate with a Web authentication routine, so that a user of the new client device can provide credential information to the web authentication routine.

6. The system of claim 1, wherein the physical address is a MAC address for the new client device.

7. The system of claim 1, wherein the plurality of different client authentication procedures comprises:
   a physical address authentication procedure, and wherein the network access device is configured to, if the physical address authentication procedure is selected:
      determine a physical address for the new client device; and
      use physical address information to authenticate the new client device and to make a determination as to whether to provide the new client device access to the data communications network based on the physical address of the new client device; and
   a combined physical address and web authentication procedure, and wherein the network access device is configured to, if the combined physical address and web authentication procedure is selected, provide the new client device with limited access to the data communications network, to allow the new client device to communicate with a Web authentication routine, so that a user of the new client device can provide credential information to the web authentication routine.

8. A method comprising:
   receiving, at a port of a network access device, a request from one of one or more client devices to access a data communications network;
   storing an indication of a selected one of a plurality of different authentication procedures a system administrator of the network access device has selected to perform authentication, the authentication based at least in part on credential information identifying the one or more client devices and credential information identifying users of the one or more client devices, the plurality of different client authentication procedures comprising a combined physical address and web authentication procedure, comprising transmitting user credential information from a client device toward the network access device according to a secure protocol, and then transmitting the user credential information from the network access device toward an authentication server;
   detecting that the new client device has attached to a port of the network access device;

upon detecting the new client device, performing authentication according to the selected one of a plurality of different authentication procedures each supported by the access device; and determining whether to grant or deny the request in accordance with the selected one of a plurality of authentication procedures.

9. The method of claim 8, further comprising transmitting the credential information from the network access device toward the authentication server in accordance with IEEE 802.1x.

10. The method of claim 8, wherein the plurality of authentication procedures comprises a physical address authentication procedure, and wherein if the physical address authentication procedure is selected, using a physical address of the new client device to make a determination as to whether to provide the new client device access to the data communications network through the network access device.

11. The method of claim 8, wherein the plurality of authentication procedures comprises a combined physical address and web authentication procedure, and wherein if the a combined physical address and web authentication procedure is selected, providing the new client device with limited access to the data communications network, to allow the new client device to communicate with a web authentication routine, and transmitting user credential information from the new client device toward the web authentication routine.

12. The method of claim 8, wherein the physical address is a MAC address for the new client device.

13. The method of claim 8, wherein the plurality of different client authentication procedures comprises:

a physical address authentication procedure, and wherein if the physical address authentication procedure is selected, using a physical address of the new client device to authenticate the new client device and to make a determination as to whether to provide the new client device access to the data communications network based on the physical address of the new client device; and wherein if the combined physical address and web authentication procedure is selected, providing the new client device with limited access to the data communications network, to allow the new client device to communicate with a Web authentication routine, so that a user of the new client device can provide credential information to the web authentication routine.

14. The method of claim 6, wherein the authentication server is coupled to the network access device through a data communications network.

15. A network access device comprising:

a memory configured to store:

an indication of a selected one of a plurality of different authentication procedures a system administrator of the network access device has selected to perform authentication, the authentication based at least in part on credential information identifying one or more client devices and credential information identifying users of the one or more client devices, the plurality of different client authentication procedures comprising a combined physical address and web authentication procedure, comprising transmitting user credential information from a client device toward the network access device according to a secure protocol, and then transmitting the user credential information from the network access device toward an authentication server; and control logic stored in the memory and configured to:

detect that a new client device has attached to a port of the network access device;

upon detecting the new client device, perform authentication according to the selected one of the plurality of different authentication procedures each supported by the access device; and determine whether to grant the new client device access to a data communications network based upon a result of the authentication.

16. The network access device of claim 11, wherein control logic is further configured to, if executing the combined physical address and web authentication procedure, transmit user credential information from the new client device to the network access device according to a secure protocol, and then transmit the user credential information from the network access device toward an authentication server coupled to the data communications network, the transmitting in accordance with IEEE 802.1x.

17. The network access device of claim 15, wherein the control logic is further configured to transmit credential information from the network access device toward an authentication server coupled to the data communications network, the transmitting in accordance with IEEE 802.1x.

18. The network access device of claim 15, wherein the plurality of different client authentication procedures comprises:

a physical address authentication procedure; and wherein the control logic is configured to, if the physical address authentication procedure is selected, determine a physical address for the new client device, and to use physical address information to authenticate the new client device; and make a determination as to whether to provide the new client device access to the data communications network based on the physical address of the new client device.

19. The network access device of claim 15, wherein the control logic is further configured to, if the combined physical address and web authentication procedure is selected, provide the new client device with limited access to the data communications network, to allow the new client device to communicate with a Web authentication routine, so that a user of the new client device can provide credential information to the web authentication routine.

20. The network access device of claim 11, wherein the physical address is a MAC address for the new client device.

21. The network access device of claim 15, wherein the plurality of different client authentication procedures comprises:

a physical address authentication procedure, and wherein the control logic is further configured to, if the physical address authentication procedure is selected:

determine a physical address for the new client device; and use physical address information to authenticate the new client device and to make a determination as to whether to provide the new client device access to the data communications network based on the physical address of the new client device; and wherein the control logic is further configured to, if the combined physical address and web authentication procedure is selected, provide the new client device with limited access to the data communications network, to allow the new client device to communicate with a Web authentication routine, so that a user of the new client device can provide credential information to the web authentication routine.

22. A method comprising:
by a network access device,
detecting that a new client device has attached to a port of the network access device;
storing an indication of a selected one of a plurality of different authentication procedures by a system administrator of the network access device to perform authentication, the authentication based at least in part on credential information identifying one or more client devices attached to ports of the network access device and credential information identifying users of the one or more client devices the plurality of different client authentication procedures comprising a combined physical address and web authentication procedure, comprising transmitting user credential information from a client device toward the network access device according to a secure protocol, and then transmitting the user credential information from the network access device toward an authentication server;
upon detecting the new client device, performing authentication according to the selected one of a plurality of different authentication procedures; and
determining whether to grant the new client device access to a data communications network based upon a result of the authentication.

23. The method of claim 22 wherein the combined physical address and web authentication procedure comprises transmitting user credential information from the new client device toward the network access device according to a SSL protocol, and then transmitting the user credential information from the network access device to an authentication server coupled to the data communications network, the transmitting in accordance with IEEE 802.1x.

24. The method of claim 22, further comprising transmitting credential information from the new client device toward an authentication server coupled to the data communications network, the transmitting in accordance with IEEE 802.1x.

25. The method of claim 22, wherein the plurality of different client authentication procedures comprises:
a physical address authentication procedure comprising:
determining a physical address for the new client device, and to use physical address information to authenticate the new client device; and
making a determination as to whether to provide the new client device access to the data communications network based on the physical address of the new client device.

26. The method of claim 22, wherein the plurality of different client authentication procedures comprises:
a combined physical address and web authentication procedure comprising providing the new client device with limited access to the data communications network, to allow the new client device to communicate with a Web authentication routine, so that a user of the new client device can provide credential information to the web authentication routine.

27. The method of claim 22, wherein the physical address is a MAC address for the new client device.

28. The method of claim 22, wherein the plurality of different client authentication procedures comprises:
a physical address authentication procedure comprising:
determining a physical address for the new client device; and
using physical address information to authenticate the new client device and to make a determination as to whether to provide the new client device access to the data communications network based on the physical address of the new client device; and
the combined physical address and web authentication procedure comprises providing the new client device with limited access to the data communications network, to allow the new client device to communicate with a Web authentication routine, so that a user of the new client device can provide credential information to the web authentication routine.

29. A program storage device readable by a machine, embodying a program of instructions executable by the machine to perform a method, the method comprising:
by a network access device, detecting that a new client device has attached to a port of the network access device, the network access device comprising:
a memory configured to store:
an indication of a selected one of a plurality of different authentication procedures a system administrator of the network access device has selected to perform authentication, the authentication based at least in part on credential information identifying one or more client devices attached to ports of the network access device and credential information identifying users of the one or more client devices the plurality of different client authentication procedures comprising a combined physical address and web authentication procedure, comprising transmitting user credential information from a client device to the network access device according to a secure protocol, and then transmitting the user credential information from the network access device toward an authentication server;
upon detecting the new client device, performing authentication according to the selected one of a plurality of different authentication procedures; and
determining whether to grant the new client device access to a data communications network based upon a result of the authentication.

30. The system of claim 1 wherein the network access device further comprises:
a plurality of ports comprising one or more input ports and one or more output ports, the plurality of ports configured to communicatively interconnect the one or more client devices to each other and to the data communications network; and
switching fabric configured to route one or more data units from the one or more input ports to the one or more output ports.

31. The method of claim 8, further comprising:
routing one or more data units from one or more input ports of the network device toward one or more output ports of the network device.

32. The network access device of claim 15, further comprising:
a plurality of ports comprising one or more input ports and one or more output ports, the plurality of ports configured to communicatively interconnect the one or more client devices to each other and to the data communications network; and switching fabric configured to route one or more data units from the one or more input ports to the one or more output ports.

33. The method of claim 22, further comprising:
routing one or more data units from one or more input ports of the network device to one or more output ports of the network device.

34. A method comprising:
receiving, at a port of an apparatus, a request from one of one or more client devices to access a data communications network;
    routing one or more data units from the one or more input ports toward the one or more output ports;
    storing an indication of a selected one of a plurality of different authentication procedures a system administrator of the apparatus has selected to perform authentication, the authentication based at least in part on credential information identifying the one or more client devices and credential information identifying users of the one or more client devices, the plurality of different client authentication procedures comprising a combined physical address and web authentication procedure, comprising transmitting user credential information from a client device to the network access device according to a secure protocol, and then transmitting the user credential information from the network access device to an authentication server;
    detecting that a new client device has attached to a port of the apparatus;
    upon detecting the new client device, performing authentication according to the selected one of a plurality of different authentication procedures each supported by the apparatus; and
determining whether to grant or deny the request in accordance with the selected one of a plurality of authentication procedures.

35. An apparatus comprising:
a plurality of ports comprising one or more input ports and one or more output ports, the plurality of ports configured to communicatively interconnect the one or more client devices to each other and to a data communications network;
switching fabric configured to route one or more data units from the one or more input ports to the one or more output ports;
a memory configured to store an indication of a selected one of a plurality of different authentication procedures a system administrator of the apparatus has selected to perform authentication, the authentication based at least in part on credential information identifying one or more client devices and credential information identifying users of the one or more client devices, the plurality of different client authentication procedures comprising a combined physical address and web authentication procedure, comprising transmitting user credential information from a client device toward the network access device according to a secure protocol, and then transmitting the user credential information from the network access device toward an authentication server; and
control logic stored in the memory and configured to:
    detect that a new client device has attached to a port of the apparatus;
    upon detecting the new client device, perform authentication according to the selected one of the plurality of different authentication procedures each supported by the apparatus; and
    determine whether to grant the new client device access to the data communications network based upon a result of the authentication.

\* \* \* \* \*